(12) United States Patent
Lee et al.

(10) Patent No.: US 10,159,944 B2
(45) Date of Patent: Dec. 25, 2018

(54) AEROSOL GENERATING AND MIXING SYSTEM OPERATING AT HIGH TEMPERATURE AND PRESSURE

(71) Applicant: FNC TECHNOLOGY CO., LTD., Gyunggi-do (KR)

(72) Inventors: Byung Chul Lee, Seoul (KR); Doo Yong Lee, Gyunggi-do (KR); Chong Chan Lee, Gyunggi-do (KR); Woo Young Jung, Gyunggi-do (KR); Hyun Chul Lee, Gyunggi-do (KR); Yong Jae Song, Gyunggi-do (KR)

(73) Assignee: FNC TECHNOLOGY CO., LTD., Gyunggi-do (KR)

( * ) Notice: Subject to any disclaimer, the term of this patent is extended or adjusted under 35 U.S.C. 154(b) by 117 days.

(21) Appl. No.: 15/444,667

(22) Filed: Feb. 28, 2017

(65) Prior Publication Data

US 2018/0015430 A1   Jan. 18, 2018

(30) Foreign Application Priority Data

Feb. 29, 2016  (KR) .................. 10-2016-0024708

(51) Int. Cl.
| | |
|---|---|
| *B01F 3/04* | (2006.01) |
| *B01F 7/18* | (2006.01) |
| *B01F 15/00* | (2006.01) |
| *B01F 15/06* | (2006.01) |
| *B05B 7/02* | (2006.01) |
| *B01F 5/04* | (2006.01) |
| *G21F 9/02* | (2006.01) |

(52) U.S. Cl.
CPC ........ *B01F 3/04063* (2013.01); *B01F 5/0473* (2013.01); *B01F 7/18* (2013.01); *B01F 15/00538* (2013.01); *B01F 15/065* (2013.01); *B05B 7/02* (2013.01); *B01F 2215/0095* (2013.01); *G21F 9/02* (2013.01); *G21Y 2002/501* (2013.01); *G21Y 2004/20* (2013.01); *Y02E 30/40* (2013.01)

(58) Field of Classification Search
CPC ........... B01F 3/04; B01F 3/04063; B01F 7/18
USPC ......................................... 261/76
See application file for complete search history.

(56) References Cited

U.S. PATENT DOCUMENTS 8,584,965 B2 * 11/2013 Guillon ............... C23C 16/4486
239/417.5

FOREIGN PATENT DOCUMENTS

| JP | 2008-249384 | 10/2008 | ............ G01N 1/22 |
| JP | 2010-518411 | 5/2010 | ............ G01N 1/22 |
| JP | 2014-531601 | 11/2014 | ............ G01N 1/02 |

(Continued)

*Primary Examiner* — Robert A Hopkins
(74) *Attorney, Agent, or Firm* — Harness, Dickey & Pierce, P.L.C.

(57) ABSTRACT

Disclosed herein is an aerosol generating and mixing system operating at a high temperature and a high pressure which includes an aerosol generating device; and an aerosol mixing device, wherein the aerosol generating device includes a pre-mixing tank and a mixing tank, and the mixing tank and the pre-mixing tank include a wing configured to rotate about a central shaft of the tank so as to agitate an inside aerosol, and an agitating motor configured to rotate the wing, and a filling nozzle of the mixing tank and the pre-mixing tank is configured to inject any of an aerosol aqueous solution and an aerosol particle.

5 Claims, 5 Drawing Sheets

(56) References Cited

FOREIGN PATENT DOCUMENTS

| KR | 10-0145032 | 4/1998 | ........... H01L 21/304 |
| KR | 10-1682707 | 11/2016 | ............. G01N 21/09 |

\* cited by examiner

Inside mixing of
pressurization type setup:
Circular spray pattern

Inside mixing of
pressurization type setup:
Folding fan spray pattern

Outside mixing of
siphon setup:
Circular spray pattern

Outside mixing of
pressurization type setup:
Folding fan spray pattern

# AEROSOL GENERATING AND MIXING SYSTEM OPERATING AT HIGH TEMPERATURE AND PRESSURE

CROSS-REFERENCE TO RELATED PATENT APPLICATION

This application claims the benefit of Korean Patent Application No. 10-2016-0024706, filed on 20 Feb. 2017 in the Korean Intellectual Property Office. The entire disclosure of the application identified in this paragraph is incorporated herein by reference.

FIELD

The present invention relates to an aerosol generating and bending system operating at a high temperature and pressure. The present invention relates to a control system which allows handling an aerosol. The present invention aims to provide a control system which is able to control in a high temperature/high pressure state since there is not any aerosol control system which is able to control in a high temperature/high pressure state.

BACKGROUND

In order to deal with a dangerous accident, for example, a Fukushima nuclear power plant's disaster, a technology development on a radioactive aerosol behavior inside a nuclear reactor building and a technology development on a containment building stability and a radioactive aerosol filtration and exhaust are underway. The conventional aerosol generating and mixing device is not equipped with any means to generate a high temperature/pressure aerosol, for example, like a dangerous accident at a nuclear power plant and to mix the aerosol with a transfer gas under a predetermined condition. Moreover, air or a nitrogen gas, in general, has been used as a transfer gas. A mixed gas condition, for example, vapor, air, nitrogen gas, etc. however exists under an environment wherein a high temperature/high pressure aerosol is present.

An atomizer type, which is one of the conventional aerosol generating equipment, in general, has been used. A high pressure injection (higher than 8 bar) is available, but a normal temperature aerosol of a very low concentration might be generated.

The generating device of a particle distribution type is able to generate an aerosol of a relatively high concentration and is configured to operate at a normal pressure/normal temperature condition. There, however, is not any system which is able to generate and mix an aerosol under the same condition of a high temperature/a high pressure. In particular, there is not any aerosol generating and mixing system which uses a mixed gas of vapor, air and a nitrogen gas as a transfer gas.

In this connection, the Korea patent registration number 100145032 describes a tool engaging and aerosol generating device which is directed to a device for generating an aerosol at a normal temperature/a normal pressure. Any system which is able to generate/inject/mix a high temperature/high pressure aerosol, is not disclosed yet.

SUMMARY

Accordingly, it is an object of the present invention to provide an aerosol generating and mixing system operating at a high temperature and a high pressure.

The present invention aims to satisfy the necessity of an aerosol generating and mixing equipment which can be adapted to a special condition, for example, a high temperature/a high pressure.

To achieve the objects, there is provided an aerosol generating and mixing system operating at a high temperature and a high pressure, which may include, but is not limited to, an aerosol generating device and an aerosol mixing device. The aerosol generating device includes a mixing tank 11 and a pre-mixing tank 28. The mixing tank may include a wing 12 configured to rotate about a central shaft of the mixing tank so as to agitate the aerosol inside the mixing tank; a filling nozzle 13 configured to inject an aerosol particle in the mixing tank; a first air injector 22 configured to inject either a compressed air or a nitrogen gas so as to pressurize the tank; and a first sight glass 27 configured to confirm the mixing state inside the mixing tank. The agitation generates an aerosol particle aqueous solution. The air of a second air injector 23 configured to inject either a compressed air or a nitrogen gas inputted through a separate line and the aerosol particle aqueous solution are injected together in a second tank, thus generating an aerosol.

The aerosol particle aqueous solution outputted from the mixing tank will pass through a gear pump 16 and will be inputted in a high pressure type and will be heated by a heater and will be inputted in a second tank. The air outputted from a second injector will pass through the heater and will be inputted in a heated state. The injection quantity can be controlled by a mass flow meter 29.

The aerosol mixture is inputted through a binary fluid nozzle into which air and an aerosol are together injected when being injected in the second tank, so the aerosol mixture may form a previously set pattern. The generation of the aqueous aerosol may need an inside mixing binary fluid nozzle 18, and the generation of the non-aqueous aerosol may need an outside mixing binary fluid nozzle.

The flow of the mixture may be carried out using a binary fluid nozzle when the flow is stabilized after it has been circulated through a bypass line 19 so as to stabilize the flow thereof before it is injected into the second tank through the binary fluid nozzle. Moreover, since the mixture passes through the bypass line while it is being heated by the heat, the temperature of the mixture can be set to a predetermined temperature. The aerosol of various pressures can be generated based on the pressure of the compressed air or the nitrogen gas inputted into the binary fluid nozzle and the pressure increase condition of the gear pump.

At the initial stage of the aerosol generation, the pressure and temperature inside the mixing tank are the normal pressure and normal temperature conditions. If the compressed air or nitrogen gas is filled using a first air injector 22, the pressure of the mixing tank may be increased up to 6~7 bar to the maximum, and if the difference pressure is set to 3~4 bar using the gear pump, and the second air injector 23 supplies the compressed air or nitrogen gas of 9~10 bar to the maximum, a high pressure aerosol corresponding to 9~10 bar can be generated. The aerosol aqueous solution inside the mixing tank will be heated by a heater at the rear end of the gear pump, and at the initial state of generation, the aerosol aqueous solution is continuously heated while it is being circulated through the bypass line, so the generation of a high temperature aerosol is available.

A ring-shaped mixing ring 21 is provided inside the second tank so as to supply a transfer gas which will be used to transfer the generated aerosol. The transfer gas is sprayed through a hole 26 formed at the mixing ring. A mixing ring blocking part 31 is provided to maintain a uniform flow speed distribution of the transfer gas at the upper and lower parts of the mixing ring. Vapor, a compressed air or a nitrogen gas may be used as the transfer gas based on the transfer condition. A mixture thereof may be used. The binary fluid nozzle is disposed in the center of the mixing ring, by which the generated aerosol can be injected into the second tank, and it will be mixed with the transfer gas transferred from the mixing ring. The aerosol gas inputted from the binary fluid nozzle may have a folding fan pattern or a circular pattern. The transfer gas may be sprayed from a portion spaced apart from a wall surface, not being attached to the wall surface of the second tank, so the phenomenon wherein the aerosol is attached to the wall surface, can be prevented. Moreover, the uniform mixing of the aerosol and the transfer can be made available.

The aerosol inputted into the second tank will be mixed with a high temperature transfer gas, so the moisture can be completely removed, which makes it possible to prevent any flocculation phenomenon.

Advantageous Effects

The present invention provides an aerosol generating and mixing system operating at a high temperature/high pressure through the aforementioned configuration.

BRIEF DESCRIPTION OF THE DRAWINGS

The present invention will become better understood with reference to the accompanying drawings which are given only by way of illustration and thus are not limitative of the present invention, wherein;

FIG. 1 is a view illustrating an aerosol generating and injecting device according to the present disclosure.

FIG. 2 is a view illustrating an embodiment of this fine spray.

FIG. 3 is a view illustrating an embodiment of the binary fluid nozzle.

FIG. 4 is a view illustrating a configuration which allows mixing an aerosol and vapor sprayed from the binary fluid nozzle, a compressed air, a nitrogen gas or a mixture thereof.

FIG. 5 is a view illustrating a mixing ring and a transfer gas spray hole which is formed at an outer circumferential surface of the mixing ring.

DETAILED DESCRIPTION

Figure 1:
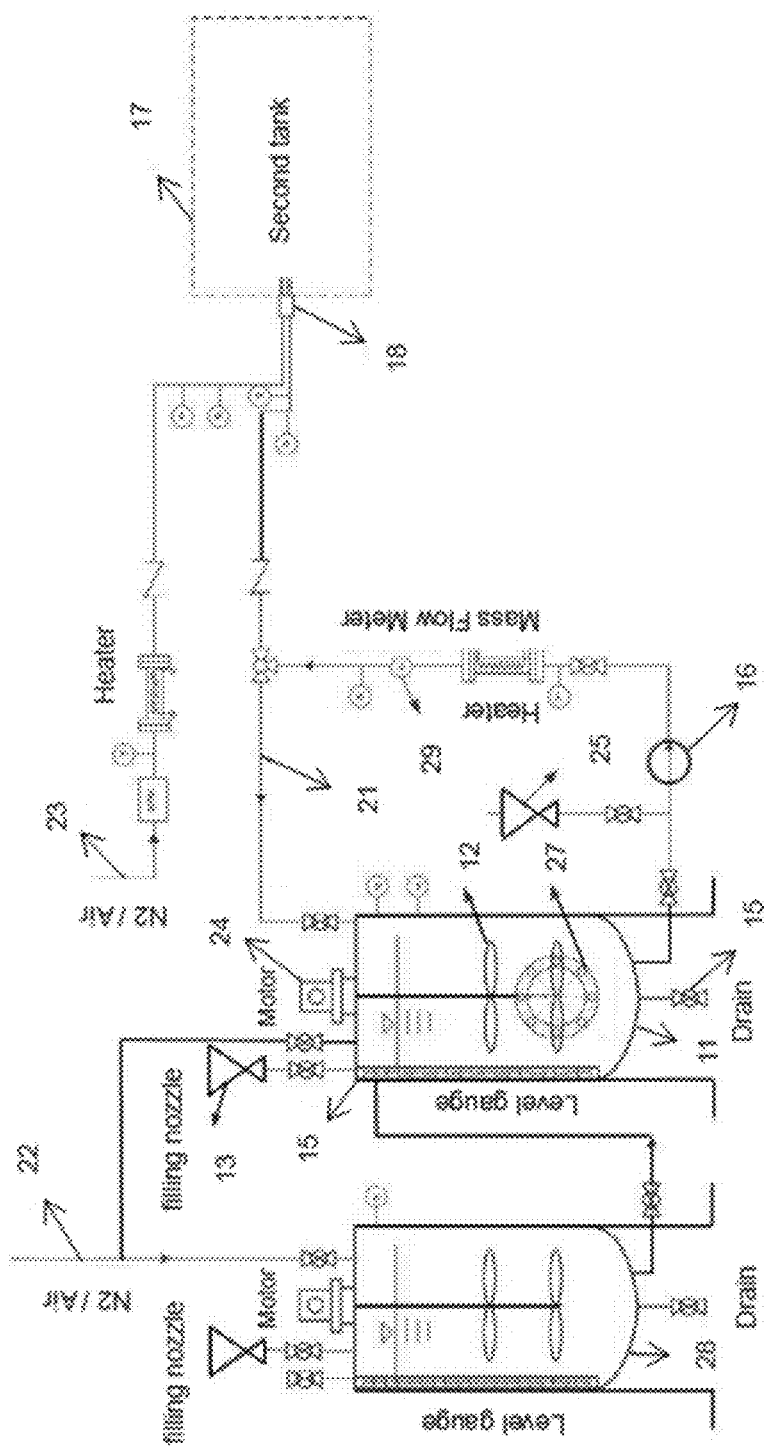
FIGS. 1 to 5 are views illustrating the configurations according to an embodiment of the present invention.
Figure 2:
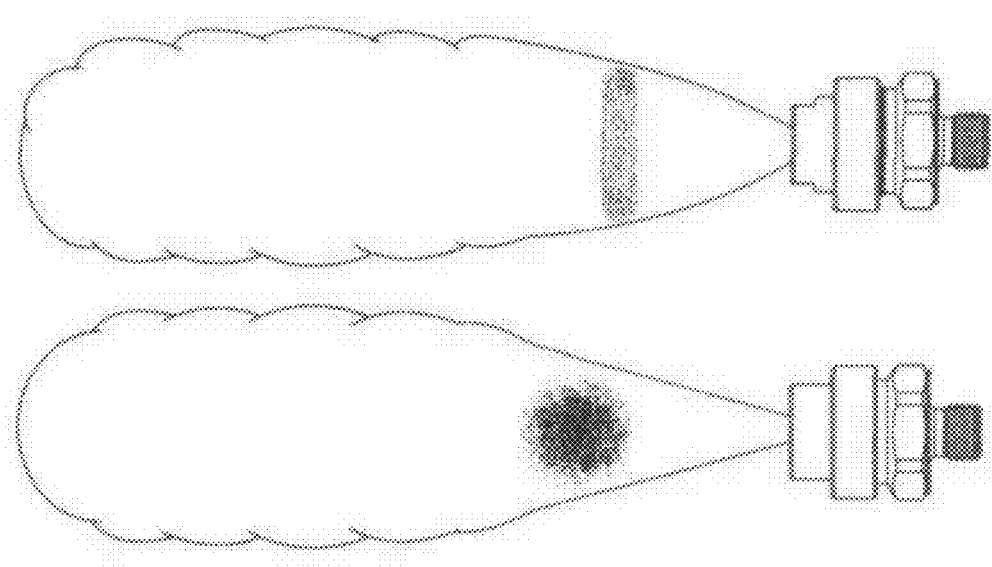
Figure 3:
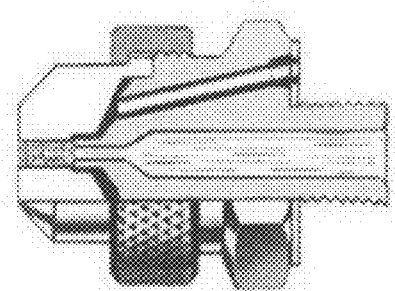
Figure 3:
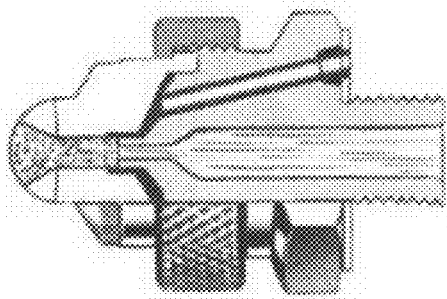
Figure 3:
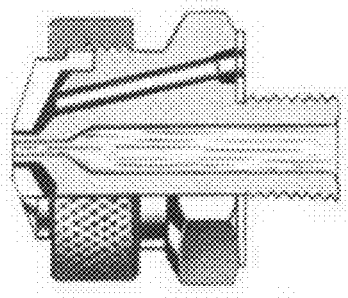
Figure 3:
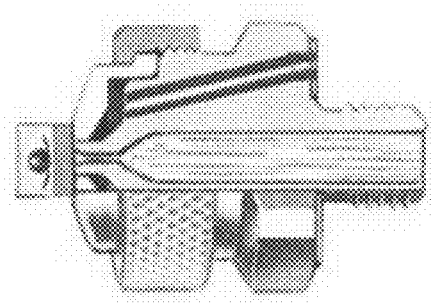
Figure 4:
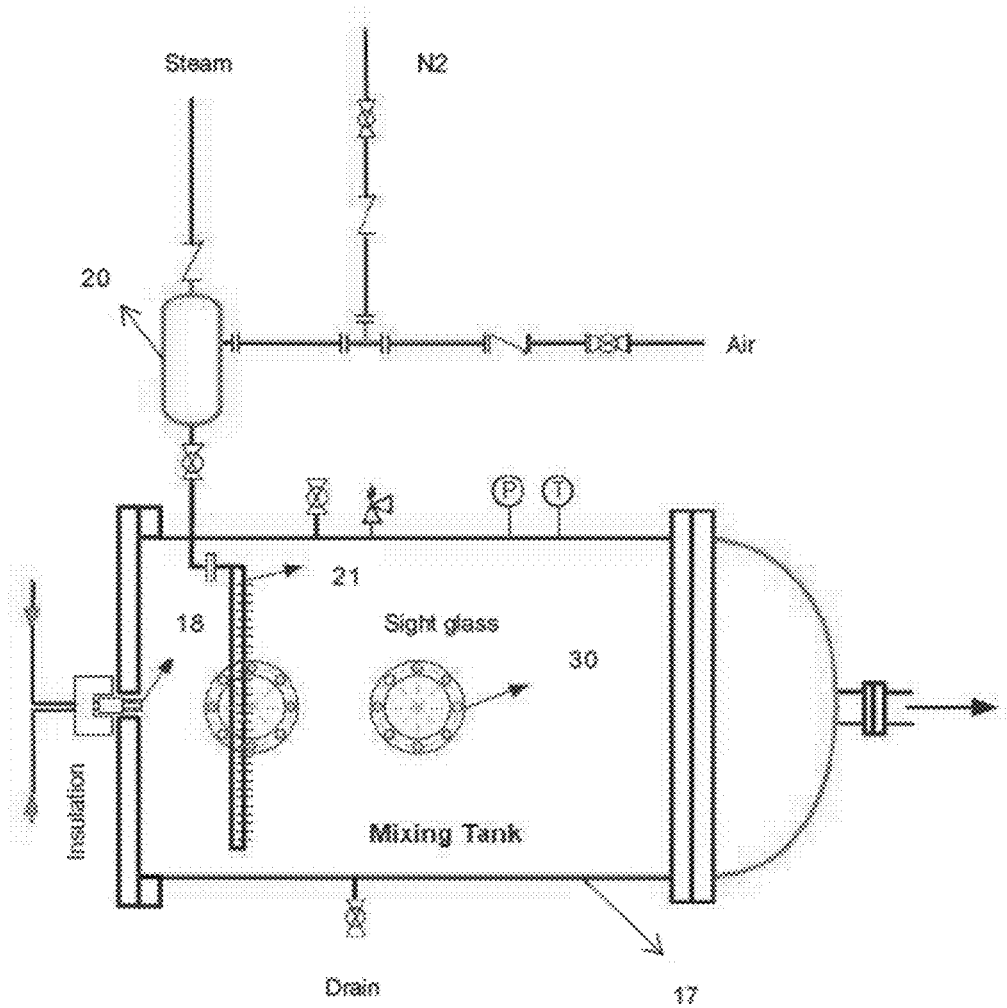

The present invention will be described with reference to the accompanying drawings. FIG. 1 is a view illustrating an aerosol generating and injecting device according to the present invention.

The pre-mixing tank 28 is configured to supply an aerosol solution to the mixing tank 11 through a pre-mixing procedure so as to supplement in real time an aerosol solution if it needs to uniformly mix the aerosol. The mixing tank is able to uniformly mix the aerosol solution inside the tank by rotating the wing 12 installed inside the tank and keep the mixed aerosol solution. The motor installed on the top of the tank is configured to rotate the wing 12 arranged along the central shaft of the tank.

In order to generate a high temperature/high pressure aerosol, it is more advantageous that the gas and water are mixed uniform, and the mixture of the aerosol state is separately injected.

According to the conventional method, the aerosol aqueous solution heated through a bypass line is bypassed, thus uniformly mixing the gas and liquid. In this case, it is easy to raise the temperature using the heater; there, however, is a problem in preparing a high pressure aerosol aqueous solution. The present invention is referred to a method wherein a pre-mixing tank is provided, by which water and gas can be uniformly mixed with the aerosol aqueous solution heated by the bypass line in an aerosol aqueous solution. More specifically, it is possible to more easily prepare a high temperature/high pressure aerosol in such a way to add the inputs which are made by the aerosol prepared through the pre-mixing tank. Here, the states of the bypassed aerosol aqueous solution and the aerosol aqueous solution inputted from the pre-mixing tank are different. When the state of the aerosol aqueous solution is a little stabilized through the mixing with the continued bypass, it will be transferred to the second tank.

The aerosol aqueous solution and the aerosol particles may be inputted through a filling nozzle 13 installed at the top, and water can be inputted into the tank through the nizzle formed installed at the top.

A level gauge 14 installed at the lateral side is connected to a drain 15 installed at the lower end, thus adjusting the water level inside the tank. The aerosol aqueous solution may be agitated and mixed while pressuring the inside of the tank up to the level required for the compressed air or nitrogen gas to be inputted into the tank so as to pressurize the tank.

The aerosol aqueous solution discharged from the tank will be injected into a second tank 17 in a high pressure state through the gear pump 16 and will be mixed with the compressed air or nitrogen gas which is injected through another passage, and will be injected into the second tank 17.

The aerosol aqueous solution may be recirculated to the mixing tank 17 through a bypass line 19 until a predetermined initial flow quality of the aerosol aqueous solution becomes stabilized.

If the flow quantity of the aerosol aqueous solution is stabilized, the aerosol and the compressed air or the nitrogen gas is injected through the binary fluid nozzle 18. The binary fluid nozzle 18 will mix the aerosol and air and generate a uniform pattern of perfect fine spray sprays. The binary fluid nozzle is provided to generate a uniform pattern of fine particles. Alternatively, it may be implemented in another type in accordance with the speed and mixing of the inputted liquid and air. FIG. 2 is a view illustrating an embodiment of this fine spray. The fine spray provided at the top in FIG. 2 shows that it is formed in a folding fan due to a difference between the pressure of air and the pressure of aerosol, thus forming a different shape from each other.

FIG. 3 is a view illustrating an embodiment of the binary fluid nozzle. The configuration of a nozzle may be changed based on the flow of liquid and gas and if the air and liquid are independently controlled.

FIG. 4 is a view illustrating a configuration which allows mixing an aerosol and vapor sprayed from the binary fluid nozzle, a compressed air, a nitrogen gas or a mixture thereof. A fine spray can be formed as it is discharged from the binary fluid nozzle. A mixing ring 21 may be installed where the fine spray is formed. The mixing ring is configured in a ring shape, and a plurality of holes 26 are formed on the outer surface thereof. A mixture (a transfer gas) of steam and a nitrogen gas (or a compressed air) can be sprayed through the holes formed at the mixing ring. The aerosol and transfer gas which are present in a fine spray state, are mixed and discharged through the exit of the second tank.

If the aerosol is generated in the aforementioned way, the high pressure condition can be satisfied by adjusting the initial pressure of the mixing tank 11, and the temperature of the aerosol can be raised in such a way to install a heater between the tanks. In particular, an aerosol satisfying the condition of the pressure which is higher than before can be obtained by installing the pre-mixing tank of the present invention.

Figure 5:
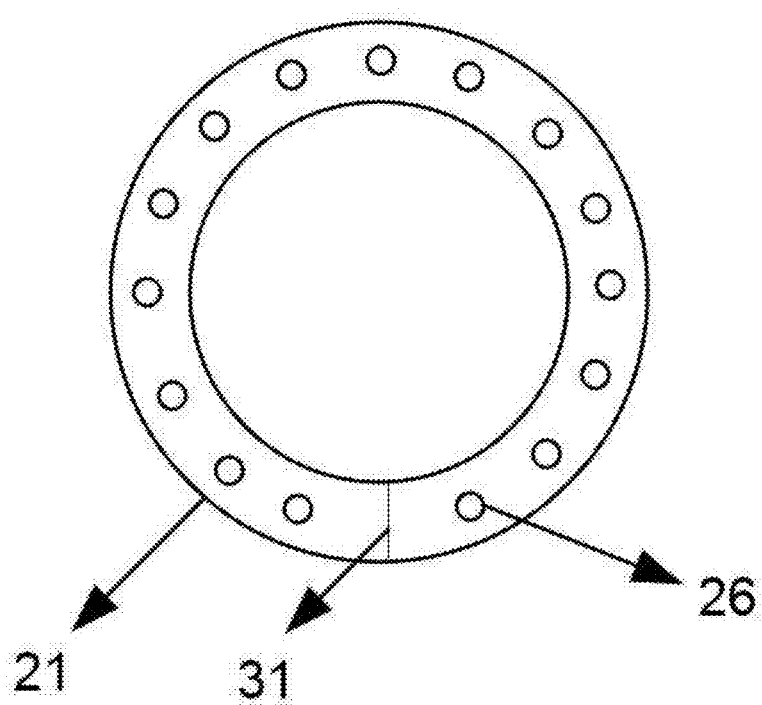

FIG. 5 is a view illustrating a mixing ring and a transfer gas spray hole which is formed at an outer circumferential surface of the mixing ring. The transfer gas sprat hole may allow uniformly spraying the vapor, compressed air, nitrogen gas or a mixture thereof which are supplied to the mixing ring. The binary fluid nozzle disposed in the center of the mixing ring may allow preventing the pattern of the aerosol from attaching to the wall surface. For this, the binary fluid nozzle sprays close to the wall surface of the second tank so as to prevent the pattern of the aerosol injected through the binary fluid nozzle disposed in the center of the mixing ring from being adsorbed to the wall surface while it is mixed covering the aerosol.

Moreover, a mixing ring block part 31 is provided at the mixing ring. Since the agitation is not carried out by the wing in the second tank 17, a uniform mixing may not be available. If the mixed gas is sprayed with the aid of the mixing ring, since the opening through which the mixed gas comes in, positions at the top, the flow speed of the mixed gas may differ at the upper and lower parts of the mixing ring. If the mixing ring block part 31 is provided at a portion symmetrically matching with the opening, the flow speed of the mixed gas discharged from the transfer gas spray hole 26 around the mixing ring block part 31, may become fast, so the discharge speed of the mixed gas can become similar together. For this reason, even though there is not any agitating device, for example, a wing, it is possible to generate a more uniform aerosol.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

LEGEND OF REFERENCE NUMBER

| | |
|---|---|
| 11: Mixing tank | 12: Wing |
| 13: Filling nozzle | 14: Lever gauge |
| 15: Drain | 16: Gear pump |
| 17: Second tank | 18: Binary fluid nozzle |
| 19: Bypass line | 20: Transfer gas mixing tank |
| 21: Mixing ring | 22: First air injector |
| 23: Second air injector | 24: Agitating motor |
| 25: Cleaning water supply line | 26: Transfer gas spray hole |
| 27: First sight glass | 28: Pre-mixing tank |
| 29: Mass flow meter | 30: Second sight glass |
| 31: Mixing ring block part | |

What is claimed is:

1. An aerosol generating and mixing system operating at a high temperature and a high pressure, comprising:

an aerosol generating device; and an aerosol mixing device, wherein the aerosol generating device includes a pre-mixing tank and a mixing tank, and the mixing tank and the pre-mixing tank include a wing configured to rotate about a central shaft of the tank so as to agitate an inside aerosol, and an agitating motor configured to rotate the wing, and a filling nozzle of the mixing tank and the pre-mixing tank is configured to inject any of an aerosol aqueous solution and an aerosol particle, and the aerosol aqueous solution discharged from the pre-mixing tank is injected in the mixing tank, and a first air injector is provided to inject any of a compressed air and a nitrogen gas into the pre-mixing tank and the mixing tank so as to pressurize the tank, and an aerosol aqueous solution is discharged with the aid of a gear pump while preventing the aerosol from hardening in the aerosol aqueous solution by means of agitation inside the mixing tank and the pre-mixing tank, and a predetermined quantity of the aerosol aqueous solution can flow using a mass flow meter, and an aerosol mixture can be produced by combining the aerosol aqueous solution passing through the mass flow meter and the air of a second air injector which is able to inject any of the compressed air and the nitrogen gas which are inputted through a separate line and by injecting the produced aerosol mixture into a second tank, thus generating an aerosol.

2. The system of claim 1, wherein the aerosol mixture is injected through a binary fluid nozzle configured to inject air and an aerosol together when injecting into the second tank, and the aerosol mixture discharged from the binary fluid nozzle is able to form a previously set pattern inside the second tank.

3. The system of claim 2, wherein the aerosol mixture discharged from the mixing tank passes through a gear pump and is injected in a high pressure state and is heated while it passes through a heater and is injected in the second tank, and the air discharged from a second air injector is heated while it passes through the heater, so the air is injected in a heated state.

4. The system of claim 3, wherein a mixing ring is provided inside the second tank and where a fine spray sprayed through the binary fluid nozzle is formed, and one or more than one of vapor, a compressed air, a nitrogen gas and a mixture thereof is discharged through a transfer gas spray hole which is formed at an outer circumferential surface as it is inputted from the top of the mixing ring in a donut shape.

5. The system of claim 4, wherein a mixing ring block part is provided at a portion symmetrically matching with where the mixing gas is inputted, so as to maintain a uniform transfer gas flow speed distribution at the upper and lower parts of the mixing ring.

* * * * *